(12) United States Patent
Achtner et al.

(10) Patent No.: US 10,154,101 B2
(45) Date of Patent: Dec. 11, 2018

(54) SYSTEM FOR RESOURCE USAGE MONITORING

(71) Applicant: BANK OF AMERICA CORPORATION, Charlotte, NC (US)

(72) Inventors: Edward J. Achtner, Kentfield, CA (US); Caitlin Chrisman Bullock, Durham, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 326 days.

(21) Appl. No.: 15/167,756

(22) Filed: May 27, 2016

(65) Prior Publication Data

US 2017/0346757 A1    Nov. 30, 2017

(51) Int. Cl.
| | |
|---|---|
| *G06F 15/173* | (2006.01) |
| *H04L 29/08* | (2006.01) |
| *H04W 4/021* | (2018.01) |
| *H04W 88/02* | (2009.01) |

(52) U.S. Cl.
CPC ............ *H04L 67/20* (2013.01); *H04L 67/306* (2013.01); *H04W 4/021* (2013.01); *H04W 88/02* (2013.01)

(58) Field of Classification Search
CPC ......... H04L 47/70; H04L 43/08; H04L 67/20; H04W 88/02
USPC ......................................................... 709/224
See application file for complete search history.

(56) References Cited

U.S. PATENT DOCUMENTS

| | | |
|---|---|---|
| 6,311,159 B1 | 10/2001 | Van Tichelen et al. |
| 6,757,362 B1 | 6/2004 | Cooper et al. |
| 6,965,868 B1 | 11/2005 | Bednarek |
| 7,415,100 B2 | 8/2008 | Cooper et al. |
| 7,546,254 B2 | 6/2009 | Bednarek |
| 7,920,678 B2 | 4/2011 | Cooper et al. |
| 8,375,068 B1 * | 2/2013 | Platt ..................... G06Q 10/10 705/7.29 |
| 8,731,942 B2 | 5/2014 | Cheyer et al. |
| 8,955,076 B1 | 2/2015 | Faibish et al. |
| 9,609,544 B2 | 3/2017 | Raleigh et al. |
| 9,692,742 B1 | 6/2017 | VanLund et al. |
| 2007/0138268 A1 | 6/2007 | Tuchman |
| 2009/0234700 A1 | 9/2009 | Galvin et al. |
| 2010/0332989 A1 | 12/2010 | Havivi |
| 2012/0016678 A1 | 1/2012 | Gruber et al. |
| 2012/0136997 A1 | 5/2012 | Yan et al. |
| 2012/0233314 A1 | 9/2012 | Jakobsson |
| 2012/0265874 A1 | 10/2012 | Hoh et al. |
| 2013/0031476 A1 | 1/2013 | Coin et al. |

(Continued)

*Primary Examiner* — Kristie D Shingles
(74) *Attorney, Agent, or Firm* — Michael A. Springs; Moore & Van Allen PLLC; Nicholas C. Russell

(57) ABSTRACT

A system for monitoring the use of resources by a user includes a mobile device, a resource usage monitoring device, a message display system, and a third party system, each have communication interfaces, memory devices, and processing devices. The system is designed to detect the presence of a user within a physical location where resources may be accessed and determine a time-efficient set of resource allocations that the user may engage in while located in a particular physical location. In some embodiments, a message may be directed to the user through visual and/or audio displays to notify the user of the time-efficient set of resource allocations and direct the user to a particular location where such allocations may be effected.

20 Claims, 6 Drawing Sheets

(56) References Cited

U.S. PATENT DOCUMENTS

| | | |
|---|---|---|
| 2013/0104197 A1 | 4/2013 | Nandakumar |
| 2013/0152092 A1* | 6/2013 | Yadgar |
| 2013/0181847 A1* | 7/2013 | Willig ...................... H04Q 9/00 340/870.03 |
| 2013/0282438 A1 | 10/2013 | Hunter et al. |
| 2014/0058825 A1 | 2/2014 | Raman et al. |
| 2014/0109085 A1 | 4/2014 | Carrara et al. |
| 2014/0222436 A1 | 8/2014 | Binder et al. |
| 2014/0229208 A1 | 8/2014 | Tamayo |
| 2014/0229405 A1 | 8/2014 | Govrin et al. |
| 2014/0230036 A1 | 8/2014 | Nandakumar |
| 2015/0237493 A1 | 8/2015 | Won et al. |
| 2015/0294322 A1 | 10/2015 | Grigg et al. |
| 2016/0012375 A1 | 1/2016 | Hanson et al. |
| 2016/0012409 A1 | 1/2016 | Hanson et al. |
| 2016/0012412 A1 | 1/2016 | Scanlon et al. |
| 2016/0012484 A1 | 1/2016 | Hanson et al. |
| 2016/0012496 A1 | 1/2016 | Hanson et al. |
| 2016/0012505 A1 | 1/2016 | Hanson et al. |
| 2016/0014552 A1 | 1/2016 | Hanson et al. |
| 2016/0112397 A1 | 4/2016 | Mankovskii |
| 2016/0293134 A1 | 10/2016 | Fortin |
| 2017/0324633 A1 | 11/2017 | Lehner et al. |
| 2017/0346757 A1 | 11/2017 | Achtner et al. |

* cited by examiner

SYSTEM FOR RESOURCE USAGE MONITORING

BACKGROUND

Users of mobile devices with high levels of computing power and network connectivity capability are able to access and use resources from multiple sources and access points. However, the capability to do so often gives rise to suboptimal efficiencies in resource allocation and usage stemming at least in part from the inability of an individual user to monitor resource usage across the multiple sources and access points and address resource allocation issues across sources and access points.

BRIEF SUMMARY

Embodiments of the present invention provide an innovative system, method and apparatus for securely monitoring the use of resources by and user and amongst devices associated with that user.

In some embodiments, a resource usage monitoring system comprises a network communication interface; a memory device storing a resource usage monitoring application; and a processing device operatively coupled to the memory device, wherein the processing device is configured to execute computer-readable program code to: receive via the network communication interface a set of identification data associated with a resource user; receive via the network communication interface a set of resource usage data associated with the resource user; and in response to receiving the set of identification data and the set of resource usage data, transmit via the network communication interface a control signal comprising a set of message data associated with the user, wherein the control signal causes a message to be displayed to the user.

In some example implementations of such embodiments, the set of identification data comprises an indication that the resource user is physically located within a structure associated with a resource access point. In some such example implementations, and in other example implementations, the control signal causes the message to be displayed to the user on a display of a mobile device associated with the resource user.

In other example implementations, the control signal causes the message to be displayed to the user on a display of dynamic sign physically located within the structure associated with the resource access point. In some such example implementations, and in other example implementations, the message is associated with the resource usage data. In some example implementations, the message comprises directions to a station location within the structure associated with the resource access point and a prompt for the resource user to approach the station location.

In some example implementations, the resource access point is a branch location of a financial institution. In some such example implementations, and in other example implementations, the processing device is further configured to execute computer-readable program code to transmit to the resource user a set of data associated with a proposed resource allocation.

In some embodiments, a method for monitoring resource usage comprises receiving via a network communication interface a set of identification data associated with a resource user; receiving via the network communication interface a set of resource usage data associated with the resource user; and in response to receiving the set of identification data and the set of resource usage data, transmitting via the network communication interface a control signal comprising a set of message data associated with the user, wherein the control signal causes a message to be displayed to the user.

In some example implementations of such embodiments, the set of identification data comprises an indication that the resource user is physically located within a structure associated with a resource access point. In some such example implementations, and in other example implementations, the control signal causes the message to be displayed to the user on a display of a mobile device associated with the resource user. In some example implementations, the control signal causes the message to be displayed to the user on a display of dynamic sign physically located within the structure associated with the resource access point.

In some example implementations, the message is associated with the resource usage data. In some such example implementations, and in other example implementations, the message comprises directions to a station location within the structure associated with the resource access point and a prompt for the resource user to approach the station location. In some such example implementations, the resource access point is a branch location of a financial institution. In some such example implementations, and in other example implementations, the method further comprises transmitting to the resource user a set of data associated with a proposed resource allocation.

In some example embodiments, a resource usage monitoring system comprises: a network communication interface; a memory device storing a resource usage monitoring application; and a processing device operatively coupled to the memory device, wherein the processing device is configured to execute computer-readable program code to: receive via the network communication interface a set of identification data associated with a resource user, wherein the set of identification data comprises an indication that the resource user is physically located within a structure associated with a resource access point; receive via the network communication interface a set of resource usage data associated with the resource user; and in response to receiving the set of identification data and the set of resource usage data, transmit via the network communication interface a control signal comprising a set of message data associated with the user, wherein the control signal causes a message to be displayed to the user. In some example implementations of such embodiments, the control signal causes the message to be displayed to the user on a display of a mobile device associated with the resource user, and wherein the message comprises a proposed resource allocation associated with the resource usage data.

In some such example implementations, and in other example implementations, the control signal causes the message to be displayed to the user on a display of dynamic sign physically located within the structure associated with the resource access point. In some such example implementations, and in other example implementations, the message comprises directions to a station location within the structure associated with the resource access point and a prompt for the resource user to approach the station location.

DETAILED DESCRIPTION OF EMBODIMENTS OF THE INVENTION

Figure 1:
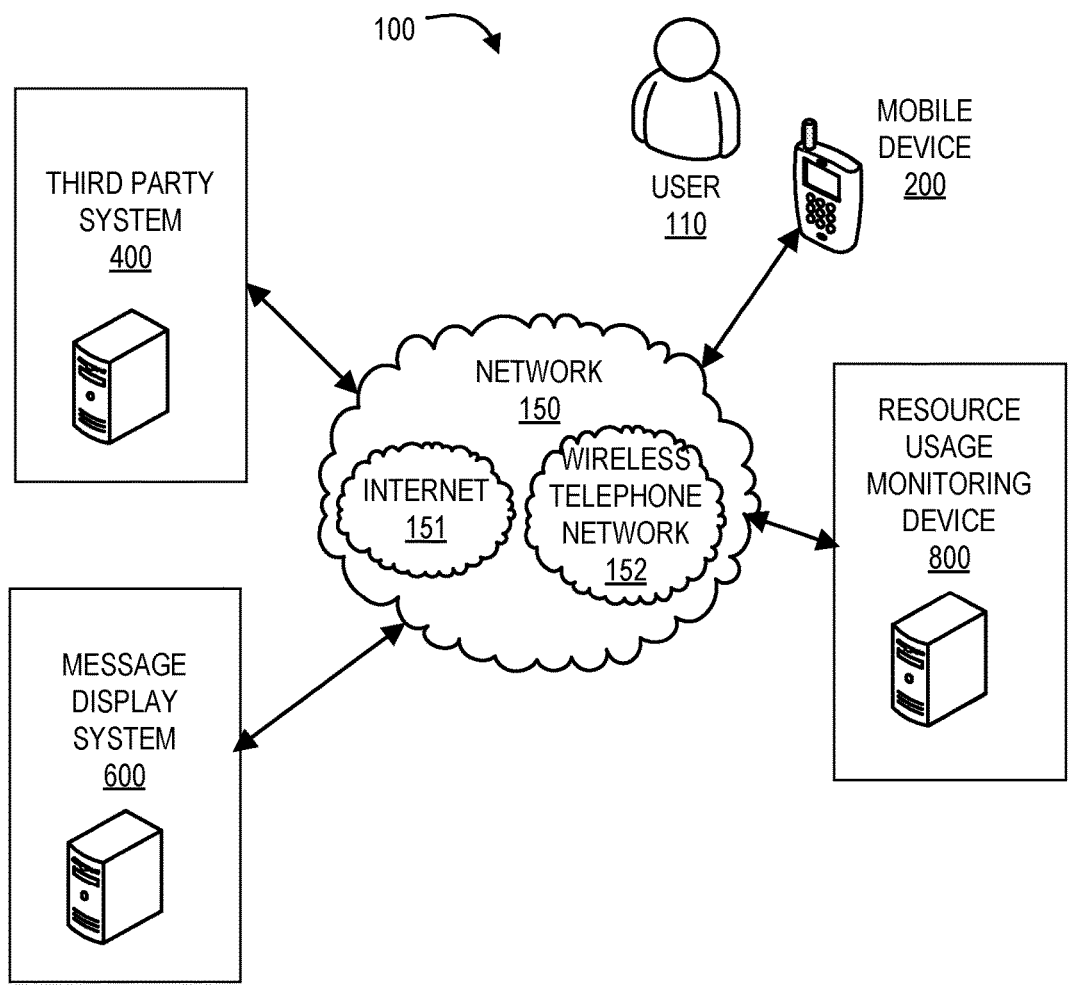
FIG. 1 is a block diagram illustrating a system for resource usage monitoring, in accordance with embodiments of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a resource user at or near a resource access point. A "user", as referenced herein, may refer to an entity or individual that has the ability and/or authorization to access and use one or more resources or portions of a resource. Furthermore, as used herein, the term "user device" or "mobile device" may refer to mobile phones, personal computing devices, tablet computers, wearable devices, and/or any portable electronic device capable of receiving and/or storing data therein.

As used herein, the term "resource" will generally refer to objects, products, goods, commodities, services, and the like, and/or the ability and opportunity to access and use the same. Some example implementations herein contemplate property held by a user, including property that is stored and/or maintained by a third party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, or other valuables, or the like. Similarly, "funds" or "available balance" refer to types of resources. For example, the term "fund" may be used to refer to one or more sets of monetary resources available to a user, and may also be referred to as an available balance, a collected balance, good funds, and usable funds.

In the context of example implementations described herein, a "transaction" or "resource distribution" refers to any transfer of resources and/or an obligation to return resources to and/or from a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

As used herein, the term "resource access point" refers to any physical location from which a user may access one or more resources or portions thereof, and/or engage in a resource distribution and/or a transaction involving one or more resources and/or portions thereof. In some contexts, a resource access point may be a purpose-built structure or building, or a space within a general-purpose or multiple occupancy building. In some contexts, a resource access point may refer to a physical terminal, machine, or other location.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Many of the embodiments and example implementations thereof described herein are directed toward solving a pervasive technical problem that consumers at all levels, from individuals to global enterprises, have long encountered, namely, the effective deployment and accessing of resources across disparate systems in a manner that is time and travel-efficient. In environments where travel undertaken by a user is time-consuming, difficult, or otherwise subject to impediments, it can be essential for resource users and sources of resources to minimize instances where a user must make multiple trips to access and/or deploy one or more resources or portions thereof. Many individuals have experienced the inefficiencies and related suboptimal resource deployment associated with needing to return to a location to retrieve a forgotten item and/or complete a necessary transaction. The likelihood of incurring such inefficiencies is compounded when resource usage and access is available through a wide variety of interactions, including in-person, via mail or other post, online, telephonic, and/or other remote interactions. Moreover, the degree of inefficiency is particularly compounded when a resource transaction that is typically performed in-person at a physical location is not performed at a convenient time (such as when performing other in-person transactions), and a separate, special-purpose return trip to a particular physical location is required to complete the transaction. In accordance with example embodiments and implementations of the invention disclosed herein, such special-purpose trips can be avoided and/or the inefficiencies with such trips can be minimized by detecting a resource user's presence within a physical location, determining a comprehensive or near-comprehensive list of resource transaction that could be accomplished at the physical location, and notifying the user of the transactions.

Many example implementations of the invention contemplate a financial institution, a resource access point (such as physical location associated with the financial institution, including but not limited to a branch location), and a user who enters the branch location. Many customers of financial institutions take advantage of the efficiencies that can be realized through the use of mobile banking applications, ATMs, and other tools for remotely accessing, using, and deploying resources. Many customers of financial institutions have also organized resources with which they are associated into multiple accounts, such a joint accounts that may be shared with a spouse, partner, children, or others, investment accounts, savings accounts, checking accounts, and other arrangements of resources, each with particular characteristics. The complexity associated with monitoring the deployment and usage of resources across multiple accounts (particularly in situations where multiple authorized users have the ability to access and deploy resources), can be difficult for an individual to navigate in a time-efficient manner. Moreover, and notwithstanding the technical tools often available to a financial institution customer, many transactions can be done efficiently in-person at a resource allocation point.

In some such example implementations, a system is located within the resource access point, or otherwise associated with the resource access point and monitors when a customer enters and/or approaches the resource access point. In some example implementations, detection of the user's mobile device is used to determine the location of the user. For example, detection of the user's mobile device may be accomplished through the receipt of a signal generated by the device, receipt of GPS or other location information from the device, receipt of a signal from an NFC device associated with the user and/or the user device, other communication received from the user device, or the like. In some example implementations, detection of the user and/or determining that a particular user is within or near a resource access point may be accomplished through detecting the user's characteristics, such as through facial recognition or other biometric identification protocols applied to video and/or other data feeds associated with the resource access point. Information associated with the identity of the user can be compiled into a set of identification data that can be transmitted and received over a network to a resource usage monitoring system.

In some example implementations, upon detection that a user is at, near, or within a resource allocation point, a set of resource usage data associated with the resource user can be compiled, transmitted, and received over a network to the resource usage monitoring system. For example, when a user approaches a mechanic's shop in the user's car, information associated with the age, condition, repair history, inspection history, local driving conditions, and/or other information associated with the use of the vehicle can be compiled and transmitted to the resource usage monitoring system. In the context of a financial institution, upon detecting that user has entered a branch location, the status of the user's accounts, pending transactions associated with the user, and other resource usage information can be compiled and transmitted to a resource usage monitoring system.

In response to receiving a set of identification data and a set of resource usage data associated with a user, particularized recommendations can be issued to the user, either via their mobile device, via a direct communication to the user, through a visual or audio message displayed in the resource access point, or through another approach. For example, in the context of a vehicle to be maintained, the resource usage monitoring system may detect that the user is likely approaching a location to have a mandatory inspection performed on the vehicle, and recognize that the vehicle is due (or over-due or near-due) for an oil change and/or other periodic maintenance, and recommend to the user that they consider having such additional services performed at that time, rather than wait until a special-purpose trip is required. In an example implementation in the context of a financial institution, a resource usage monitoring system may detect that a customer has entered a branch location to acquire a cashier's check. The resource usage monitoring system may also recognize that the resources in one of the user's accounts are nearly depleted, and may alert the user to that fact. Moreover, the resource usage monitoring system may notify the user regarding products or services that may be beneficial to the user, notify the user of additional transactions that they may want to complete while in the branch location, and/or direct the user to a spot within the branch (such as a particular line, teller station, office, kiosk, or other position) where the user can engage in their desired transactions.

FIG. 1 provides a block diagram illustrating an environment 100 for a system for resource usage monitoring, in accordance with an embodiment of the invention. In some embodiments, the user resource includes financial assets that are securely distributed in a system associated with the user and/or one or more third party systems. As illustrated in FIG. 1, the environment 100 includes a user 110 where the user represents a customer having a relationship with at least one financial institution. A user of the system may be a person, but may also be a business or any other entity. In a typical environment thousands of users may access the system of the invention.

The environment 100 also may include a plurality of user devices. The user devices may comprise any machine, apparatus, system or the like that may be connected to and communicate with other devices over network 150. At least one of the devices may comprise a mobile device 200 for use by the user 110. The mobile device 200 may be any portable device that employs a processor and memory and can perform computing functions, and that may be connected to or access network 150. As used herein, the mobile device 200 may comprise any mobile communication device, such as a cellular telecommunications device (i.e., a cell phone or mobile phone), personal digital assistant (PDA), a mobile Internet accessing device, or other mobile device. The mobile device 200 may be connected to a network by wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology.

The mobile device 200 may be configured to communicate over network 150 with at least one third party entity system 400 of a third party entity such as a financial institution and with one or more resource usage monitoring devices, such as resource usage monitoring device 800 as will hereinafter be described. The mobile device 200 may also be configured to communicate over network 150 with one or more message display systems 600 as will hereinafter be described. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the mobile device 200 is configured to connect with the network 150 and may be used to log the user 110 into the third party entity system 400 of the third party financial institution. A user 110 in order to access the user's account(s) typically uses an online banking application and/or mobile banking application on the third party entity system 400 and must authenticate with the third party entity system 400. For example, logging into the third party entity system 400 generally requires that the user 110 authenticate his/her/its identity using a user name, a passcode, a cookie, a biometric identifier, a private key, a token, and/or another authentication mechanism that is provided by or for the user 110 to the third party entity system 400 via the mobile device 200. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the mobile device 200 using an authentication procedure for the device such as a thumbprint or password. A soft authentication may require only a user identification such as user name. A soft level of authentication may be used, for example, where the user has already logged-in to the mobile device 200 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

Figure 2:
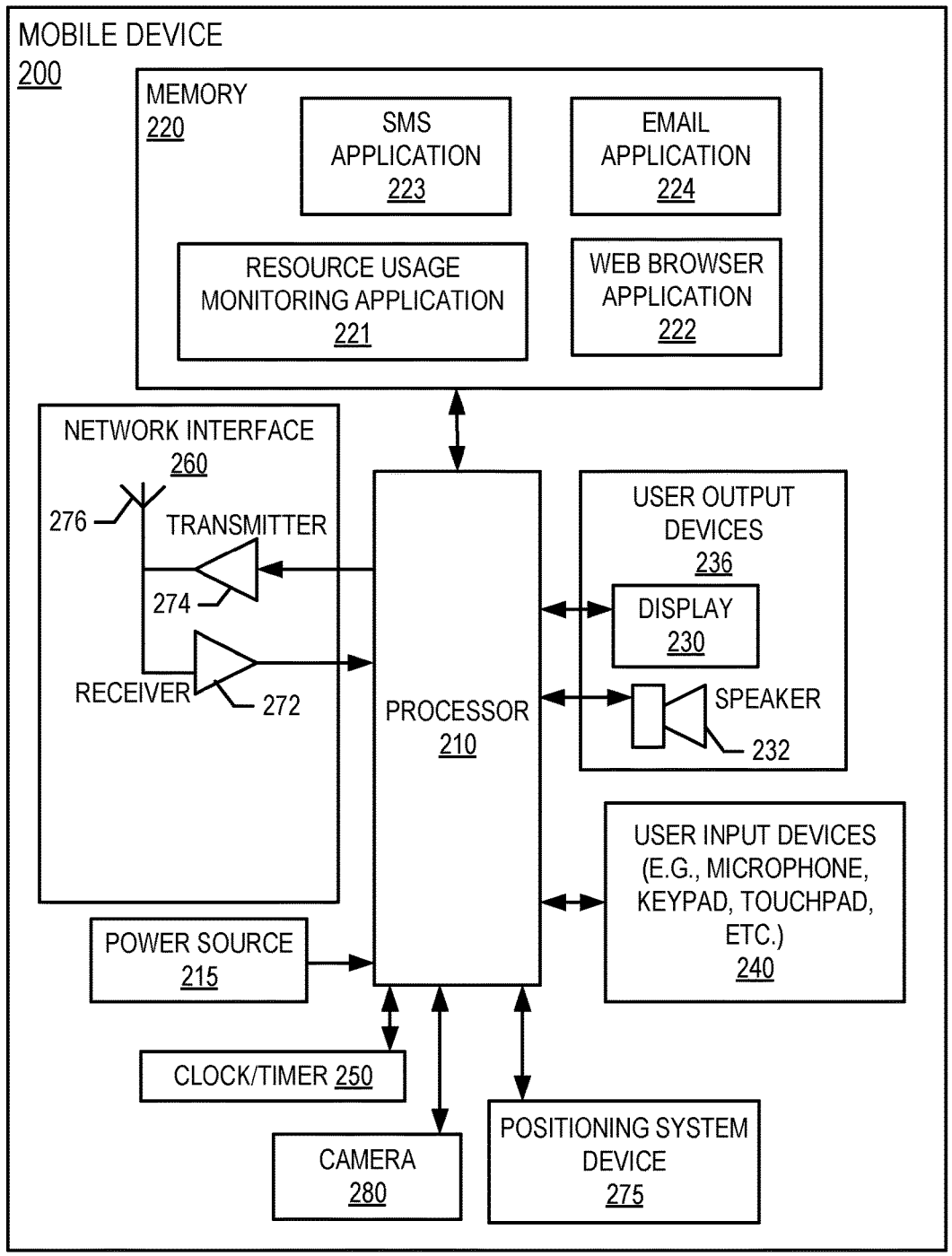
FIG. 2 is a block diagram illustrating an example mobile computing device as depicted in FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks. The processor 210 may also be configured to use a camera 280 to capture and/or recognize images and/or a positioning system device 275, such as a compass, GPS system, or other device capable of identifying a position and/or location of the mobile device 200.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s).

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile 200 and/or one or more of the process/method steps described herein. The memory 220 includes a resource usage monitoring application 221 that may be used to allow communication with a third party system such as the third party entity system 400 and/or the resource usage monitoring device to implement the system of the invention. The use of the resource usage monitoring application 221 may facilitate access to the system of the invention by providing log-in systems including user authentication systems, account information, system controls or the like. The resource usage monitoring application 221 also communicates with the third party entity system 400 to allow the user to set up and/or control the system of the invention.

These applications also typically provide a graphical user interface (GUI) on the display 230 that allows the user 110 to communicate with the mobile device 200, the third party entity system 400 and/or other devices or systems. The memory 220 can also store any of a number of pieces of information and data used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Figure 3:
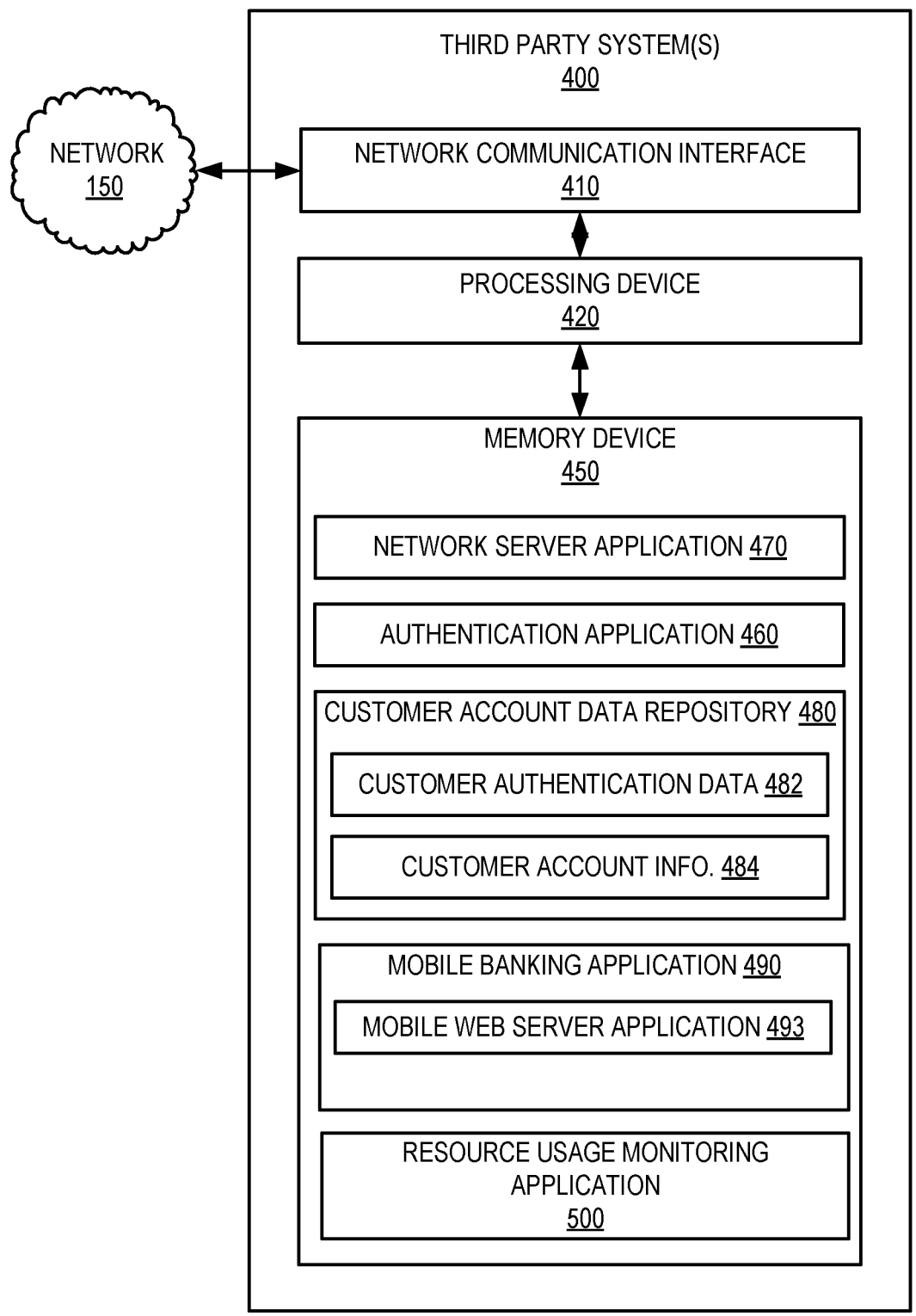
FIG. 3 is a block diagram illustrating an example third party system as depicted in FIG. 1, in accordance with embodiments of the invention.
Figure 4:
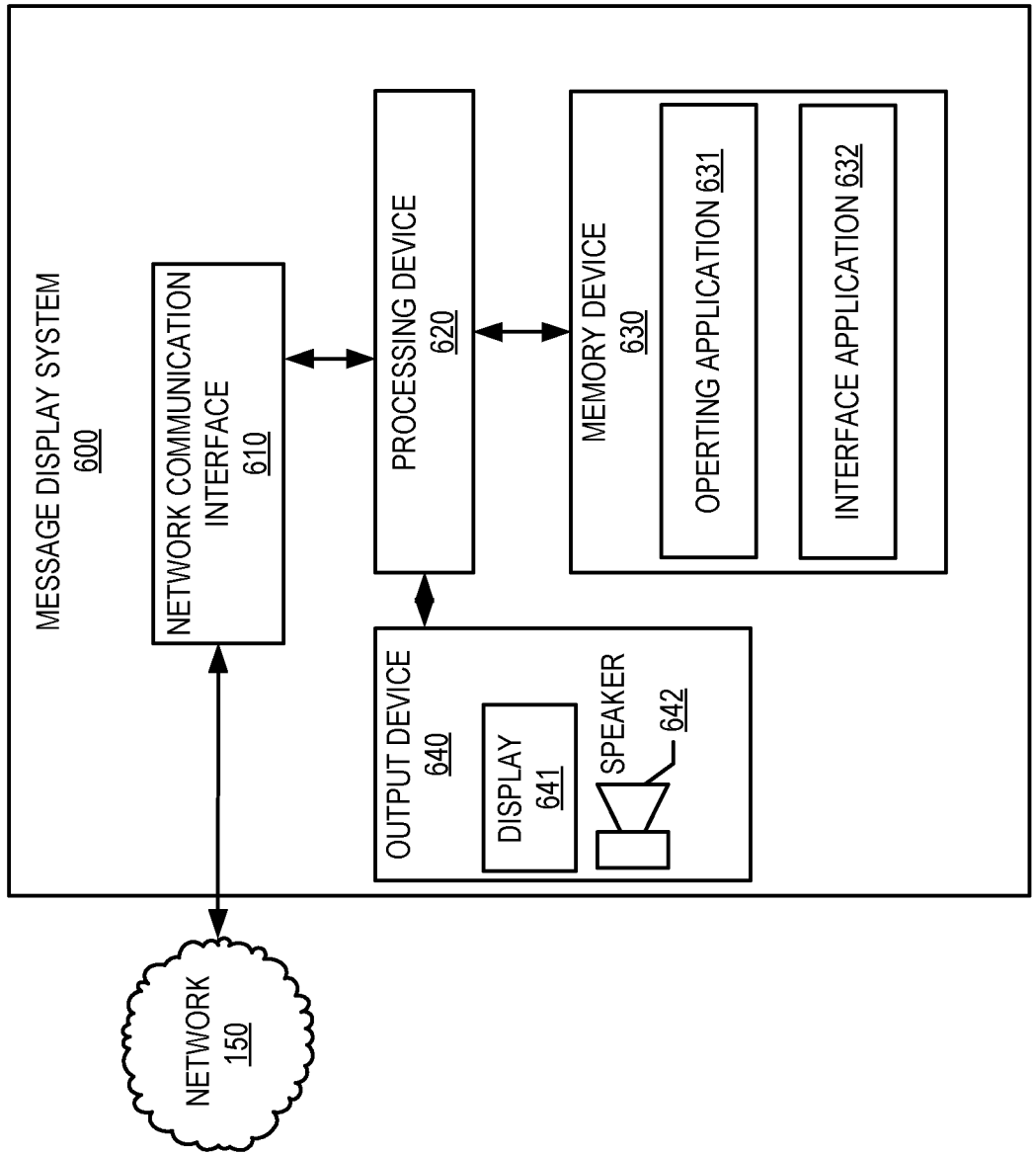
FIG. 4 is a block diagram illustrating an example message display system as depicted in FIG. 1, in accordance with embodiments of the invention.

FIG. 3 provides a block diagram illustrating the third party system such as third party entity system 400, in greater detail, in accordance with embodiments of the invention. As illustrated in FIG. 4, in one embodiment of the invention, the third party entity system 400 includes one or more processing devices 420 operatively coupled to a network communication interface 410 and a memory device 450. In certain embodiments, the third party entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the third party entity system 400 described herein. For example, in one embodiment of the third party entity system 400, the memory device 450 includes, but is not limited to, a network server application 470, an authentication application 460, a customer account data repository 480 which includes customer authentication data 480 and customer account information 484, a mobile banking application 490 comprising a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the third party system(s) 400 described herein, as well as communication functions of the third party system(s) 400. The mobile banking application 490 communicates with the user mobile device 200 to facilitate communication between the user and the financial institution.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the third party system(s) 400.

The third party entity system 400 further includes a resource usage monitoring application 500 that communicates with the user's mobile device 200 and may communicate with the message display systems 600. The resource usage monitoring application 500 functions to manage a user's resources as informed by the resource usage monitoring application 856 of the resource management device 800.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the resource management device 800 and/or the message display system 600. The processing device 420 is configured to use the network communication interface 410 to transmit and/or receive data and/or commands to and/or from the other devices connected to the network 150.

FIG. 4 provides a block diagram illustrating message display system 600, in accordance with embodiments of the invention. A "message display system" as used herein means a device, apparatus and/or system that is capable of communicating with and transmitting information or data to and/or receiving information or data from other devices, systems or apparatuses including over network 150 and present information to a user. FIG. 4 illustrates an exemplary embodiment of a message display system. The message display system 600 may be for example, but not limited to, a display monitor, a configurable sign, an audio transmission system, a visual transmission system, an audio-visual display, or the like. The list of message display systems provided herein is not exhaustive such that the message display system 600 may be any device that includes a communication interface or module, software and/or hardware that allow the device to communicate data and/or information related to the device with other devices and/or systems over network 150 and present information to a user.

As illustrated in FIG. 4, one exemplary embodiment of a message display system 600 may generally include, but is not limited to, a network communication interface 610, a processing device 620, and a memory device 630 such as described herein. The processing device 620 is operatively coupled to the network communication interface 610 and the memory device 630. The message display system may also have an output device 640 for controlling the physical operation of the device. The output device 640 may comprise one or more displays 641 for presenting visual information to one or more users. The display 641 may communicate with the processing device 620 to provide content to be displayed. The output 640 may also comprise one or more speakers 642 for presenting audio information to one or more users. The output device 640 may also comprise controllers such as programmable logic controllers (PLC), proportional integral derivative controllers (PID) or other machine controllers.

In one embodiment, applications having computer-executable program code that instruct the processing device 620 to operate the various systems of the message display system including network communication interface 610 to perform certain communication functions and to perform certain logic, data processing, and data storing functions of the application as described herein are stored in memory device 630. The applications may include an operating application 631 that controls the output device 640 and the functions of the message display system to control operation of the message display system 600 during use, along with interface application 632, which controls the network communication interface 610 and may also manage the receipt and processing of display information received by the message display system 600.

The network communication interface 610 is a communication interface having one or more communication devices configured to communicate with one or more other devices on the network 150. The processing device 620 is configured to use the network communication interface 610 to receive information from and/or provide information and commands to other devices and systems via the network 150. The network communication interface 610 may be configured to communicate over a wireless connection or a wired connection such as described above, including but not limited to a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the message display system may also include a communication interface that may be connected by a hardwire connection to the resource management device. The communication interface may comprise a connector such as a USB, SATA, PATA, SAS or other data connector for transmitting data to and from the message display system. In some embodiments the message display system may comprise a port or plug that is compatible with a mating port or plug on the resource management device.

Figure 5:
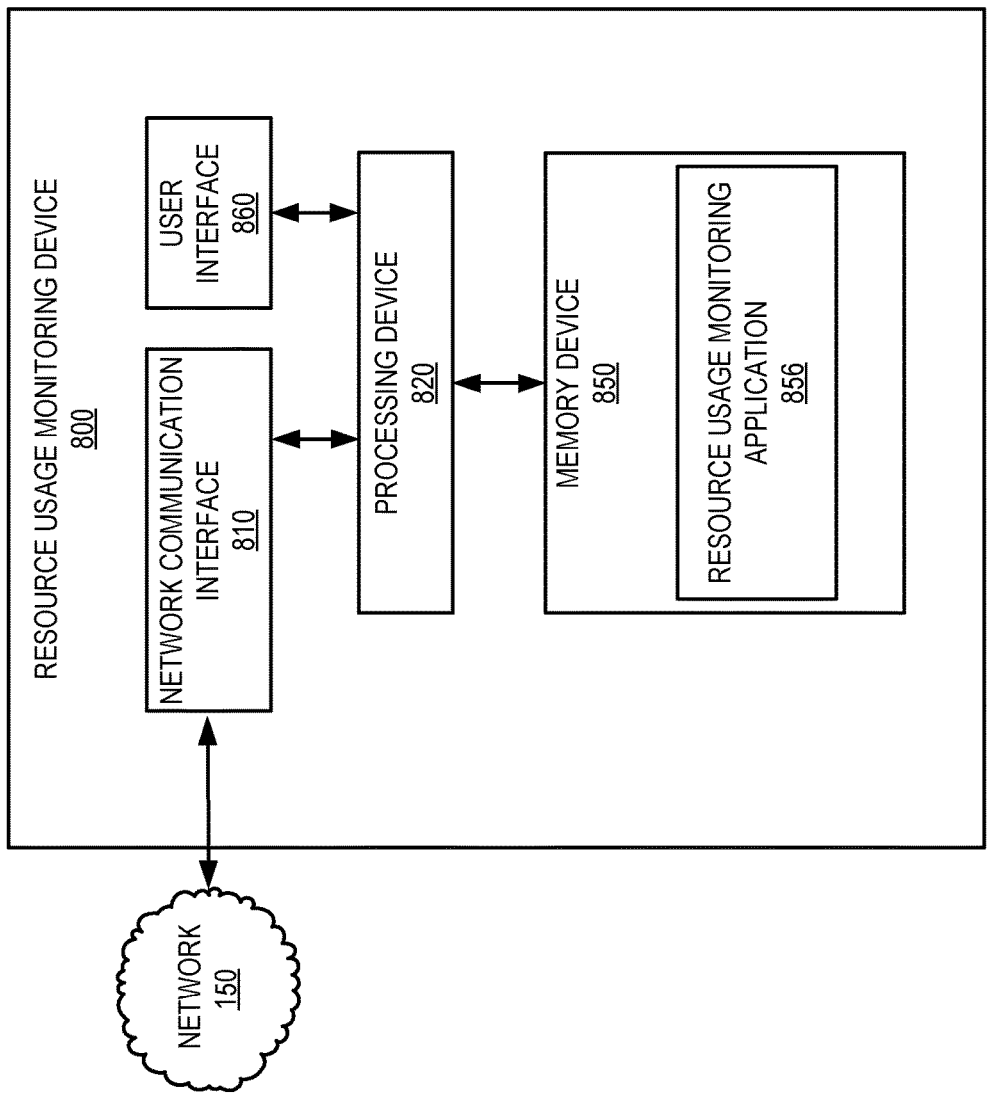
FIG. 5 is a block diagram illustrating an example resource usage monitoring device in accordance with embodiments of the invention.

As illustrated in FIG. 5, one exemplary resource usage monitoring device 800 may generally include, but is not limited to, a network communication interface 810, a processing device 820, a memory device 850, and a user interface 860 such as described herein. The processing device 820 is operatively coupled to the network communication interface 810, the memory device 850 and the user interface 860. In one embodiment, applications having computer-executable program code that instructs the processing device 820 to operate the various functions of the resource usage monitoring device to perform certain communication functions and to perform certain logic, data processing, and data storing functions of the application as described herein are stored in memory device 850. The applications may comprise a resource usage monitoring application 856 that communicates with the mobile device 200 and the third party system 400 as will be described.

The network communication interface 810 is a communication interface having one or more communication devices configured to communicate with one or more other devices on the network 150. The processing device 820 is configured to use the network communication interface 810 to receive information from and/or provide information and commands to other devices and systems via the network 150. The network communication interface 810 may be over a wireless connection or a wired connection such as described above, and may facilitate communication between the resource usage monitoring device 800 and the mobile device 200, the third party system 400, and/or the message display system 600.

The resource usage monitoring device 800 may also comprise a user interface 860. The user interface 860 allows inbound and/or outbound communication with the resource usage monitoring device and may take a wide variety of forms depending on the type of resource usage monitoring device 800. The user interface may comprise interface devices as previously described herein, or may comprise other user interface devices. In some embodiments the user interface 860 may be controlled by the third party entity such that the resource usage monitoring device 800 is secure. In some embodiments, such as where the resource usage monitoring device is integrated with the mobile device 200, the user interface 860 may use any user interface associated with the mobile device 200. In some embodiments, the resource usage monitoring application 856, processing device 820 and the memory device 850 are operable to communicate with and/or effect a transaction with a third party system 400. The resource usage monitoring application 856 of resource usage monitoring device 800 communicates with a third party system such as third party entity system 400. In other words, the resource usage monitoring device 800 is programmed with the resource usage monitoring application 856 to communicate with a third party system (e.g. the third party entity system 400) where the third party system is capable of effectuating the movement and/or transfer of resources from one location and/or association to another location and/or association.

Referring to FIGS. 1, 4 and 5, an embodiment of one process and system will be described. In this embodiment, a user 110 is in control of a mobile device 200, which is configured to communicate via network 150 with a third party system 400 and a resource usage monitoring device 800. In this particular example embodiment, the third party system 400 is associated with a financial institution, and the user 110 has a relationship with that financial institution, at least in the sense that the financial institution holds and/or manages one or more accounts associated with the user 110. As shown in FIG. 1, and described elsewhere herein, the third party system 400 is capable of communicating via network 150 with resource usage monitoring device 800, and message display system 600. In some example implementations, in addition to (or alternatively to) communicating via the network 150, third party system 400 may be in direct machine-to-machine communication with message display system 600 and/or resource usage monitoring device 800.

In some example implementations, the financial institution operates resource access points, such as branch locations, storefronts, other financial centers, and the like, located at physical, geographic locations where a user, such as user 110 can physically visit and engage in, coordinate, discuss, and/or initiate transactions involving one or more resources and/or portions thereof. In one such implementation, when user 110 nears or enters a branch location, the presence of user 110 is detected and a set of identification data is compiled and transmitted to the resource usage monitoring device 800, which receives the set of identification data via network communication interface 810. In many instances, the presence of user 110 will be detected by recognizing the user's mobile device 200, in the form of recognizing a signal transmitted by the mobile device 200 (such as a message sent via network interface 260 over network 150). Such a signal may take any form sufficient to notify an entity, such as third party system 400 or resource usage monitoring device 800, of the identity of the user 110. For example, a resource usage monitoring application 221 stored on mobile device 200 may be configured to periodically acquire position data (such as GPS data, mapping data, compass headings, vector data, and/or other positioning information) from positioning system device 275 and transmit that information via network interface 260 and network 150 to third party system 400 and/or resource usage monitoring device 800.

The presence of user 110 near or within a resource access point such as a financial institution branch location may also be detected and/or confirmed using other approaches. For example, the user 110 may carry an NFC device, an RFID tag, and/or other device (incorporated into mobile device 200 or otherwise) that is capable of notifying a system associated with the branch location of the user 110's presence. Other systems associated with the third party system 400, and/or the branch location may also be used to recognize the user 110. For example, video or other visual feeds associated with the branch location may be subjected to facial recognition and/or other biometric recognition protocols to identify when a particular user 110 enters the branch location.

Upon detecting the presence of user 110 in or near the branch location, either through directly receiving a set of identification information associated with the user 110 from the mobile device 200 or by receiving a set of identification information associated with the user 110 from the third party system 400 via network 150, the resource usage monitoring device 800 transmits a request to the third party system 400 for resource usage information associated with the user 110. In an example implementation, the resource usage monitoring application 856 of resource management device 800 transmits a secured request such as a token to the third party system 400 over network 150 via network communication interface 810 based on information stored in memory device 850 and/or as provided by the user 110 and/or by the mobile device 200, and/or by other sources to the resource usage monitoring device 800. The secured request typically includes a request for resource usage monitoring information, where resource usage monitoring information is a set of resource usage information that can be used by the resource usage monitoring device 800 to ascertain whether there are transactions associated with user 110 that can be efficiently performed contemporaneously at the branch location. The secured request may include, alternatively or in addition to a request for resource usage information, identification information and/or other information associated with making a request for resource usage information associated with user 110. In a system that uses a token or other secured request, the resource usage monitoring information may have no intrinsic value. The secured request is informed by and transmitted in accordance with the terms, conditions, or other rules set by the third party entity system 400, the user 110, and/or the resource usage monitoring device 800. For example, a secured request may be sent requesting account status information associated with user 110. Tokenization security systems are known where a token having no intrinsic value is substituted for sensitive data such that the authorization does not involve the transmission of sensitive data. As a result, security is enhanced and security risks from data breaches are reduced. In the present invention, the token may be substituted for user identification information, user account information, personal identification information, and/or potentially sensitive information about the use of resources by the user and/or others associated with accounts of the user, such that the token generated by the resource usage monitoring device 800 may be attributed to a user account at the third party system 400. The mobile device 200 and the resource usage monitoring device 800 may not have user account information or other potentially sensitive information which is instead securely maintained by the third party system 400. As a result, the security of the user's financial or otherwise sensitive information can be maintained by a single entity such that security over the user's financial or otherwise sensitive information may be controlled and enhanced.

The resource usage monitoring device 800 generates the secured request based on the set of identification information using the resource usage monitoring application 856 and transmits the secured request using network communication interface 810 to the third party system 400 over network 150. The secured request is received by the third party system 400 and the resource usage monitoring information (such as a request for a set of information pertaining to the status of one or more accounts and/or transactions associated with the user) in the request is recognized by the third party system 400. Upon retrieving an/receiving the requested the third party system 400 transmits the requested information to the resource usage monitoring device 800 in accordance with terms and conditions associated with the resource usage monitoring application 500. The terms and conditions of any resource usage monitoring activities and communication associated therewith may be agreed to by the user 110 and the third party entity associated with the third party system 400 and stored in resource usage monitoring application 500. Upon engaging in a relationship with a third party entity associated with third party system 400 (such as when a customer opens an account with a financial institution and/or agrees to acquire permission to access and use resources via an application associated with mobile device 200, the user 110 may register themselves and/or their mobile device 200 with third party entity 400 and agree to interact with resource usage monitoring device 800 such that the third party entity recognizes a secured request from resource management device 800 as being properly associated with that user 110 and respond to requests received from resource usage monitoring device 800. For example, the user 110 may register through the on-line banking application 490. The user 110 may also register with the third party system 400 other than using an on-line application.

Regardless of the protocols applied when requesting, compiling, and transmitting information associated with the resource usage of a user, such as user 110, upon receipt of a set of resource usage data associated with the user 110 via the network communication interface 810, the processing device 820 and the resource usage management application 856 interact to identify transactions or other efforts to access, deploy, and/or manage resources that can be performed while the user 110 is located at, near, or within the resource access point. For example, if a user 110 enters a financial institution branch location to acquire a cashier's check, the resource usage monitoring device 800 may detect that the user 110 may be able to perform a transfer of funds from one account to another, deposit funds that were sent to the user from another individual or entity, resolve an set of questions associated with a user's investments and/or other financial products, and/or otherwise engage in one or more in-person transactions during a single visit to the branch location.

Upon detecting the presence of a user 110 at, near, or within a resource access point, (such as a branch location), receiving a set of resource usage monitoring information, and determining that there may be additional transactions in which the user can engage, the resource usage monitoring device 800 transmits a control signal that causes a message to be displayed to the user 110. In some implementations, the control signal is sent via the network communication interface 810 over the network 150 to the user's mobile device 200, where resource usage monitoring application 221 may respond by cause processor 210 to direct content to the user output devices 236, such as the display 230 or the speaker 232. For example, the content displayed may include a message listing the types of transactions that could be performed during the user 110's visit to the branch location, and/or a message identifying a financial institution representative (such as through providing a name, photograph, and other message information), who can assist the user 110.

In some implementations, as an alternative to, or in addition to, presenting a message on the user 110's mobile device 200, the resource usage monitoring device 800 may send a control signal to a message display system 600, such as a configurable sign, monitor, audio system, other playback system, and/or any other system or device described herein or otherwise capable of interacting with a control signal originating from resource usage monitoring device 800 to present a message to the user 110. For example, a control signal originating from resource usage monitoring device 800 may be received by network communication interface 610 via network 150, and processed by the processing device 620, the operating application 631, and the interface application 632 to cause a message to be presented in the branch location via the display 641 or the speaker 642. Example messages include, but are not limited to, invitations that a particular user 110 approach a particular line or station within the branch location (such as a particular teller or other representative, or an automated kiosk within the branch location), advertisements for products and services that may be beneficial to the user 110, and other information about efficient resource usage.

In addition to the communications from the resource usage monitoring device 800 to a financial institution, the system 100 may allow communication to the resource usage monitoring device 800 such that the user and/or third party system may direct the resource usage monitoring options. For example, the user may set limits on the frequency with which a financial institution may cause targeted communications be initiated to the user and may limit the extent to which messages and/or other information directed to the user may be presented at or in a resource access point. Such limits may be based on the preferences of the user, the perceived importance of the messages, the policies of the financial institution, and other factors. The user may directly communicate with the resource usage monitoring device 800 over network 150 using mobile 200 or the user instructions may be communicated to the third party system 400 from the user such as by mobile device 200 over network 150 and the third party institution system 400 may communicate with the resource usage monitoring device 800 over network 150. In some embodiments the limits or controls put on the resource usage monitoring device 800 may originate with the third party system 400 such that the resource usage monitoring device may be controlled at least in part by the third party system.

Figure 6:
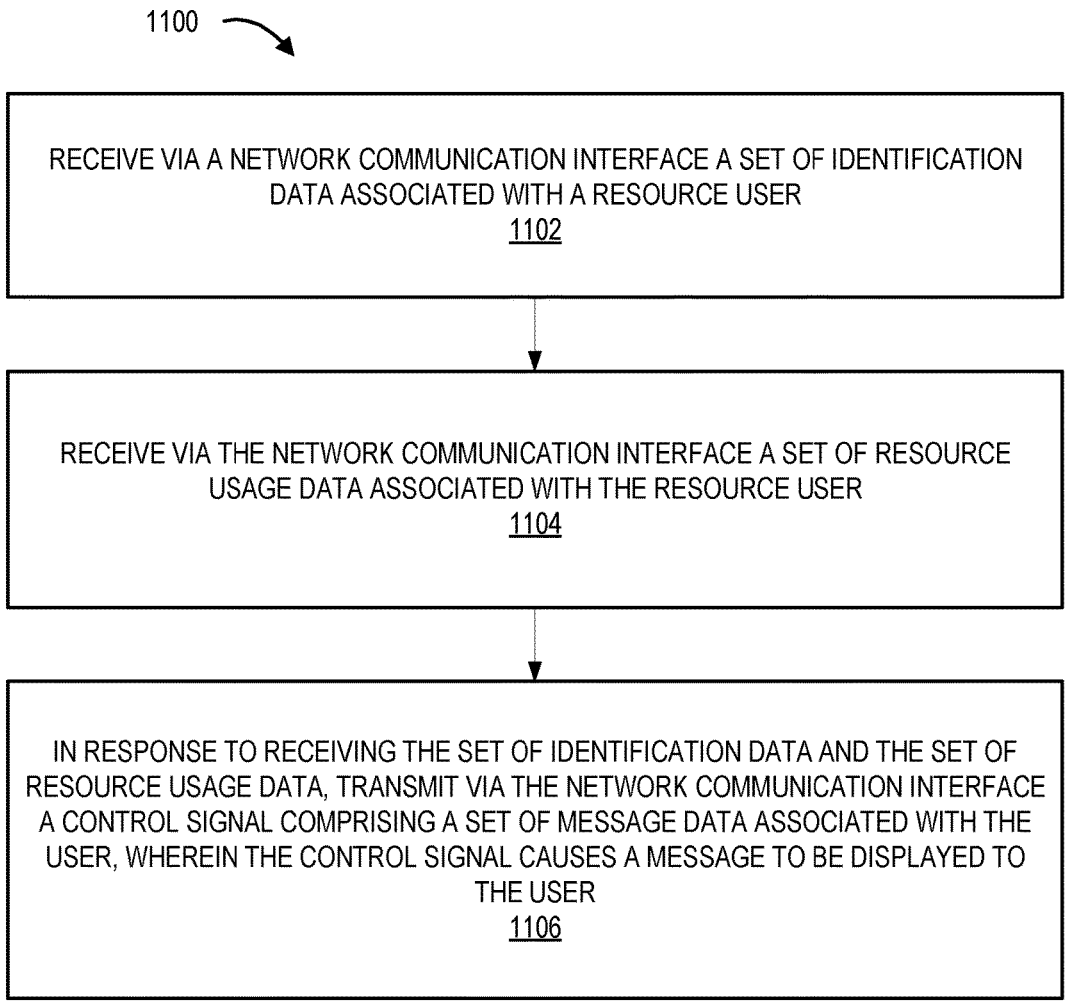
FIG. 6 is a flowchart illustrating an example methods for resource usage monitoring in accordance with embodiments of the invention.

FIG. 6 depicts a process 1100 for resource usage monitoring in accordance with embodiments of the invention. As depicted in FIG. 6, process 1100 commences at block 1102, which comprises receiving via a network communication interface a set of identification data associated with a resource user. As discussed herein, many example implementations of embodiments of the invention described herein, including but not limited to example implementations of process 1100, contemplate customers of a financial institution who, at some point in time, physically positions themselves at, near, or within a physical location associated with the financial institution, such as a branch location. In some example implementations of block 1102, a device, such as the resource usage monitoring device 800 described elsewhere herein, receives a set of identification data associated with a customer. The set of identification information may include any information sufficient to identify the user, and may originate from a user's mobile device, systems associated with a financial institution or other third party, or from another source. For example, a user's mobile device may be equipped with a mobile banking application or other software or specialized equipment to notify a branch location of the user's presence. Alternatively, or in addition to recognizing a user's mobile device, systems associated with the financial institution, such as the video or other visual images captured within a branch location, may be processed in accordance with facial recognition and/or other biometric protocols to recognize a customer who has entered a branch location. In some example implementations of block 1102, the set of identification data includes an indication that the resource user (such as a customer) is physically located within a structure associated with a resource access point. In many example implementations of block 1102 where the identification data indicates that the resource user is physically located within a structure, the structure will be a space associated with a workplace, such as an office, branch location of a financial institution, and/or other location where a user (such as a customer) can engage in one or more in-person transactions or interactions with others, and/or with one or more resources (or portions of resources). Regardless of the specific make-up of the set of identification information (including but not limited to the content of the set of identification information and any tokenization or other security protocols applied to the set of information), or the source of such set of identification information, example implementations of block 1102 contemplate receiving the set of identification data associated with a resource user via a network communication.

As shown in FIG. 6, process 1100 continues with block 1104, which includes receiving via the network communication interface a set of resource usage data associated with the resource user. Some example implementations of block 1104 contemplate a resource usage monitoring device, such as resource usage monitoring device 800 described elsewhere herein, that receives via a network communication interface a set of resource usage data associated with the resource user. The set of resource usage data can include any information regarding the resources used by a user, including but not limited to the status of any resources held by the user, use histories, patterns of use, and other information associated with the access to, deployment, accumulation, and/or monitoring of resources. In example implementations that contemplate a customer of a financial institution, the resource usage data may include information such as account balances, transaction histories, consolidated statements, alerts, threshold-based indicia, and other information or communications regarding the accounts associated with the customer and their use.

As depicted in FIG. 6, process 1100 continues to block 1106, which includes, in response to receiving the set of identification data and the set of resource usage data, transmitting via the network communication interface a control signal comprising a set of message data associated with the user, wherein the control signal causes a message to be displayed to the user. Many example implementations of block 1106 contemplate conveying information to the user regarding the user's resource usage and opportunities to engage in one or more additional in-person transactions while the user is physically located in a particular location, with the goal of improving the efficiency of each trip that the user takes the resource access point (such as each trip that the user takes to visit a branch location associated with a financial institution. As such, in many example implementations, the message is associated with the resource usage data. In examples that arise in the context of a financial institution customer, the message could pertain to account balances, transaction histories, additional products and services available to the customer, and/or other potential transactions. In such example implementations, the message could include a set of data associated with a proposed resource allocation, such as a payment, fund transfer, investment, borrowing transaction, and/or the like.

In some example implementations of block 1106, the control signal causes the message to be displayed to the user on a display of a mobile device associated with the user. For example, resource usage monitoring device 800 may transmit a control signal over network 150 to the mobile device 200, that, when processed by processor 210 in accordance with protocols established by resource usage monitoring application 221 causes the display 230 to present a message to the user. In other example implementations of block 1106, the control signal causes the message to be displayed to the user on a display of a dynamic sign physically located within the structure associated with the resource access point. For example, resource usage monitoring device 800 may transmit a control signal over network 150 to the message display system 600, such that upon receipt of the control signal via network communication interface 610, the processing device 620 may apply protocols established by the operating application 631 and/or the interface application 632 to cause a message to be directed to the user 110 through the display 641 and/or through the speaker 642. In some example implementations, the message displayed on a dynamic sign, such as message display system 600 comprises direction to a station location within the structure associated with the resource access point and a prompt for the resource user to approach the station location. In some such example implementations, a user 110 may be directed to a particular location or representative, such as a particular teller station, representative office, line, kiosk, or other position for further service within the resource access point. In some example implementations, an image of a service representative and/or a map to a particular location may be presented. Moreover, an audio message might prompt the user to approach a particular individual or location, or to approach a communication terminal, such as an interactive screen, courtesy phone, or other communication device for further service.

As presented herein and described with respect to process 1100 and elsewhere in this disclosure, embodiments of the present invention contemplate effecting a physical change in a particular environment associated with a resource. In particular, a resource usage monitoring device, such as the resource usage monitoring device 800 described herein is capable of receiving a set of identification data and a set of resource usage data, and based on its processing of at least those sets of data, generating a control signal that effects a physical change, in the form of a change in a visual display, the playing of an audio signal over a speaker, or the presentation of a message on a mobile device associated with the user. As such, in at least some example implementations, the resource usage monitoring device contemplates detecting that an individual has entered a particular structure, acquiring particularlized information about that individual, and responsively altering the environment into which the user has entered to convey information to the individual and direct the individual to a particular location and/or direct the individual to engage in one or more particular activities.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s)

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A resource usage monitoring system comprising:
a network communication interface;
a memory device storing a resource usage monitoring application; and
a processing device operatively coupled to the memory device, wherein the processing device is configured to execute computer-readable program code to:
receive via the network communication interface a set of identification data associated with a resource user, wherein the identification data associated with the resource user comprises a detection of the resource user within a physical location of a resource allocation point;
receive via the network communication interface a set of resource usage data associated with the resource user, wherein resource usage data comprises access, deployment, accumulation, and monitoring of financial institution resources associate with the resource user; and
in response to receiving the set of identification data and the set of resource usage data, transmit via the network communication interface a control signal comprising a set of message data associated with the user, wherein the control signal causes a message to be displayed to the user, wherein the message comprises particularized recommendations based on resource usage data associated with the resource user.

2. The system of claim 1, wherein the set of identification data comprises an indication that the resource user is physically located within a structure associated with a resource access point.

3. The system of claim 2, wherein the control signal causes the message to be displayed to the user on a display of a mobile device associated with the resource user.

4. The system of claim 2, wherein the control signal causes the message to be displayed to the user on a display of dynamic sign physically located within the structure associated with the resource access point.

5. The system of claim 4, wherein the message is associated with the resource usage data.

6. The system of claim 4, wherein the message comprises directions to a station location within the structure associated with the resource access point and a prompt for the resource user to approach the station location.

7. The system of claim 6, wherein the resource access point is a branch location of a financial institution.

8. The system of claim 7, wherein the processing device is further configured to execute computer-readable program code to transmit to the resource user a set of data associated with a proposed resource allocation.

9. A method for monitoring resource usage, the method comprising:
receiving via a network communication interface a set of identification data associated with a resource user, wherein the identification data associated with the resource user comprises a detection of the resource user within a physical location of a resource allocation point;
receiving via the network communication interface a set of resource usage data associated with the resource user, wherein resource usage data comprises access, deployment, accumulation, and monitoring of financial institution resources associate with the resource user; and
in response to receiving the set of identification data and the set of resource usage data, transmitting via the network communication interface a control signal comprising a set of message data associated with the user, wherein the control signal causes a message to be displayed to the user, wherein the message comprises particularized recommendations based on resource usage data associated with the resource user.

10. The method of claim 9, wherein the set of identification data comprises an indication that the resource user is physically located within a structure associated with a resource access point.

11. The method of claim 10, wherein the control signal causes the message to be displayed to the user on a display of a mobile device associated with the resource user.

12. The method of claim 10, wherein the control signal causes the message to be displayed to the user on a display of dynamic sign physically located within the structure associated with the resource access point.

13. The method of claim 12, wherein the message is associated with the resource usage data.

14. The method of claim 12, wherein the message comprises directions to a station location within the structure associated with the resource access point and a prompt for the resource user to approach the station location.

15. The method of claim 14, wherein the resource access point is a branch location of a financial institution.

16. The method of claim 15, further comprising transmitting to the resource user a set of data associated with a proposed resource allocation.

17. A resource usage monitoring system comprising:
a network communication interface;
a memory device storing a resource usage monitoring application; and
a processing device operatively coupled to the memory device, wherein the processing device is configured to execute computer-readable program code to:
receive via the network communication interface a set of identification data associated with a resource user, wherein the identification data associated with the resource user comprises a detection of the resource user within a physical location of a resource allocation point
receive via the network communication interface a set of resource usage data associated with the resource user, wherein resource usage data comprises access, deployment, accumulation, and monitoring of financial institution resources associate with the resource user; and
in response to receiving the set of identification data and the set of resource usage data, transmit via the network communication interface a control signal comprising a set of message data associated with the user, wherein the control signal causes a message to be displayed to the user, wherein the message comprises particularized recommendations based on resource usage data associated with the resource user.

18. The system of claim 17, wherein the control signal causes the message to be displayed to the user on a display of a mobile device associated with the resource user, and wherein the message comprises a proposed resource allocation associated with the resource usage data.

19. The system of claim 17, wherein the control signal causes the message to be displayed to the user on a display of dynamic sign physically located within the structure associated with the resource access point.

20. The system of claim 19, wherein the message comprises directions to a station location within the structure associated with the resource access point and a prompt for the resource user to approach the station location.

* * * * *